(12) United States Patent
Kim

(10) Patent No.: US 9,157,197 B2
(45) Date of Patent: Oct. 13, 2015

(54) FUNCTIONAL ROAD STRUCTURE AND CONSTRUCTION METHOD THEREOF

(71) Applicant: Yongho Kim, Seoul (KR)

(72) Inventor: Yongho Kim, Seoul (KR)

( * ) Notice: Subject to any disclaimer, the term of this patent is extended or adjusted under 35 U.S.C. 154(b) by 0 days.

(21) Appl. No.: 14/264,230

(22) Filed: Apr. 29, 2014

(65) Prior Publication Data

US 2014/0356064 A1    Dec. 4, 2014

(30) Foreign Application Priority Data

May 30, 2013    (KR) ........................ 10-2013-0061768

(51) Int. Cl.
| | | |
|---|---|---|
| *E01C 21/00* | (2006.01) | |
| *E01C 17/00* | (2006.01) | |
| *E01C 7/04* | (2006.01) | |
| *E01C 11/16* | (2006.01) | |
| *E01C 11/22* | (2006.01) | |
| *E01C 15/00* | (2006.01) | |

(52) U.S. Cl.
CPC . *E01C 17/00* (2013.01); *E01C 7/04* (2013.01); *E01C 11/16* (2013.01); *E01C 11/226* (2013.01); *E01C 15/00* (2013.01)

(58) Field of Classification Search
CPC ......... E01C 7/04; E01C 11/16; E01C 11/226; E01C 15/00; E01C 17/00
USPC .................. 362/153.1; 404/22, 28, 31, 71, 77
See application file for complete search history.

(56) References Cited

U.S. PATENT DOCUMENTS

| | | | | |
|---|---|---|---|---|
| 1,587,487 | A * | 6/1926 | Mulford | 404/22 |
| 5,308,187 | A * | 5/1994 | Nix | 404/17 |
| 6,027,280 | A * | 2/2000 | Conners et al. | 404/19 |
| 7,021,786 | B1 * | 4/2006 | Sandor, Sr. | 362/153 |
| 7,316,519 | B2 * | 1/2008 | Ryman et al. | 404/22 |
| 7,942,564 | B2 * | 5/2011 | Lee et al. | 362/576 |
| 8,192,829 | B2 * | 6/2012 | Sturley | 428/156 |
| 8,672,578 | B2 * | 3/2014 | Blocken et al. | 404/22 |
| 2004/0184263 | A1 * | 9/2004 | Patti | 362/145 |
| 2008/0272278 | A1 * | 11/2008 | Shewa et al. | 250/206 |
| 2010/0188842 | A1 * | 7/2010 | Yohananoff | 362/153.1 |
| 2012/0275859 | A1 * | 11/2012 | Caroli | 404/22 |

FOREIGN PATENT DOCUMENTS

| | | |
|---|---|---|
| JP | 10-212703 A | 8/1998 |
| JP | 2003-064617 A | 3/2003 |
| KR | 10-2013-0035336 A | 4/2013 |

\* cited by examiner

*Primary Examiner* — Raymond W Addie
(74) *Attorney, Agent, or Firm* — KORUS Patent, LLC; Seong Il Jeong

(57) ABSTRACT

A functional road structure having functions such as emission of light in various colors, freeze protection in winter by radiating heat, or excellent water permeability for trails, parking lots or sidewalks and a construction method thereof. According to this invention, the functional road construction method includes cleaning the road by removing debris and leveling the road evenly; paving a base plate of mesh on the road where the size of mesh is smaller than that of filling stones; laying pipes on the base plate at a predetermined interval where the pipes is made of transparent material and light-emitting-diodes and a control board therefor are inserted inside the pipes; disposing a panel on the pipe where the panel has a six-sided shape with open top and bottom; and filling the filling stones inside the panel.

9 Claims, 6 Drawing Sheets

FUNCTIONAL ROAD STRUCTURE AND CONSTRUCTION METHOD THEREOF

BACKGROUND OF THE INVENTION

1. Field of the Invention

This invention relates to a functional road structure, and more particularly, a functional road structure having functions such as emission of light in various colors, freeze protection in winter by radiating heat, or excellent water permeability for trails, parking lots or sidewalks and a construction method thereof.

2. Description of the Related Art

Trails, parking lots or sidewalks are usually made of natural materials with excellent water permeability such as gravel, crushed stones or soil, but not concrete nor asphalt.

However, trails, parking lots or sidewalks with simple functions for pedestrians to walk or for vehicles to drive, are dull and featureless with a monotonous shape.

Trails, sidewalks or parking lots at swimming pool, water-park, hotel, pension, theme park or amusement park require decorative effects and aesthetics due to the nature of the business. However, conventional roads have not yet met such requirements.

SUMMARY OF THE INVENTION

Problems which the Invention Aims to Solve

One purpose of this invention is to provide trails, parking lots or sidewalks with specific functions such as emission of light in various colors or heat radiation along with decorative effects and aesthetics for swimming pool, water-park, hotel, pension, theme park or amusement park.

Means for Solving the Problems

In order to achieve the above purpose, a method of constructing a functional road structure according to the present invention comprises steps of: (S10) cleaning road to remove debris and level the road evenly; (S20) paving a base plate to pave the base plate 110 of mesh on the road where the size of mesh is smaller than that of filling stones 140; (S30) laying pipes to lay one or more pipes 120 on the base plate 110 at a predetermined interval where the pipes are made of transparent material inside which light emitting diodes (LEDs) 123 and a control board 122 for LEDs are inserted; (S40) disposing a panel to dispose a six-sided panel 130 with open top and bottom on the above pipes 120; and (S50) filling stones to fill stones inside the panel 130.

In one embodiment, the step of cleaning road further comprises digging a pit 160 as deep as the height of the functional road structure and constructing the functional road structure in the pit 160.

In another embodiment, the step of filling further comprises constructing an inclined side-closing part 150 on both sides of the functional road structure raised after the construction thereof.

Further, in another embodiment, the base plate 110 is made of non-woven fabric or mesh. Also, in another embodiment, the filling stones 140 are made of transparent synthetic resin. Also, in another embodiment, the filling stones comprise either one or more of gravel, soil or granite.

A functional road according to this invention comprises: a base plate 110 of mesh which is paved on the road where the size of mesh is smaller than that of filling stones 140; pipes 120 which is laid on the base plate 110 at a predetermined interval where the pipes are made of transparent material and inside which LEDs 123 and a control board 122 for LEDs are inserted; a six-sided panel 130 with open top and bottom which is disposed on the pipes 120; and filling stones 140 which are filled inside the panel 130 and around the pipes 120.

In another embodiment, the filling stones 140 are made of transparent synthetic resin. Further, in another embodiment, the filling stones comprise either one or more of gravel, soil or granite.

Effects of the Invention

The functional road structure and construction method thereof according to this invention provide trails, parking lots or sidewalks with specific functions such as emission of light in various colors for the prevention of safety accidents at night along with decorative effects, fascination and aesthetics for visitors at swimming pool, water-park, hotel, pension, theme park or amusement park.

The functional road structure and construction method thereof according to this invention radiate heat for freeze protection of parking lots or providing warmth to visitors at water-park or acupressure trails in winter.

DETAILED DESCRIPTION OF THE INVENTION

Embodiments of the functional road structure and construction method thereof as per the invention are described in detail hereafter referring to the enclosed drawings.

Figure 1:
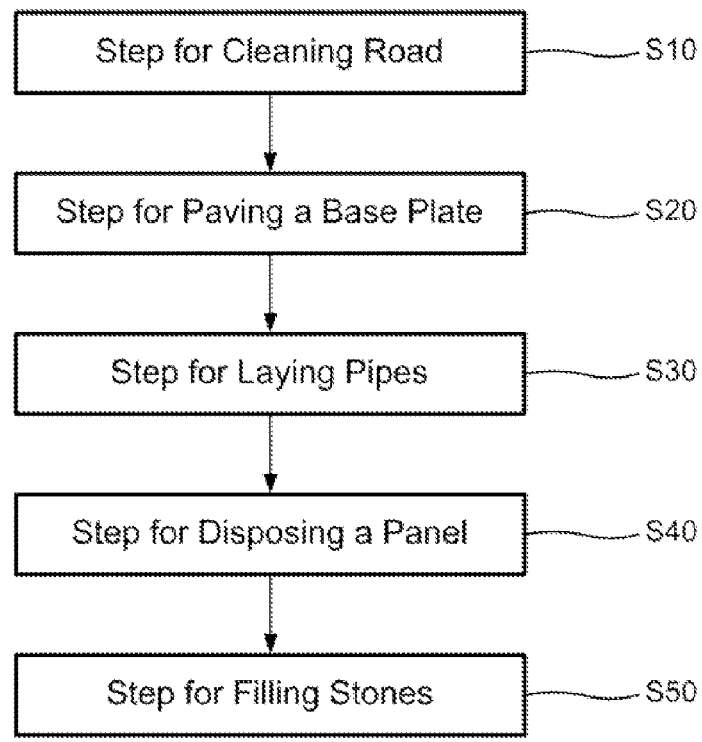
FIG. 1 is a flowchart showing a method of constructing a functional road structure according to the present invention.
Figure 2:
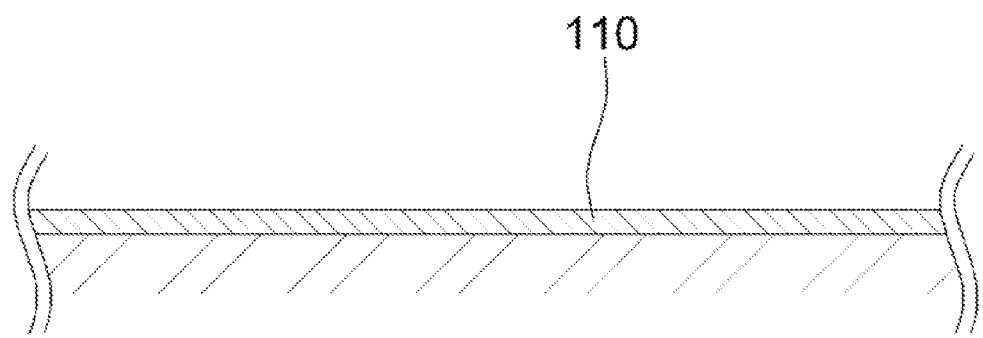
FIG. 2 shows the step of paving a base plate.

A method of constructing a functional road structure as per the invention comprises the steps of (S10) cleaning road, (S20) paving a base plate, (S30) laying pipes, (S40) disposing a panel, and (S50) filling stones as shown in FIG. 1.

Step for Cleaning Road (S10):

This step is for cleaning the road by removing debris such as tree roots or rocks and leveling the road evenly.

Step for Paving a Base Plate (S20)

This step is for paving a base plate 110 on the road.

The base plate 110, made of non-woven fabric or mesh smaller than the stones to be filled on the road, keeps the road from stones or weeds and helps rainwater to be quickly absorbed into the ground.

Step for Laying Pipe (S30)

Figure 3:
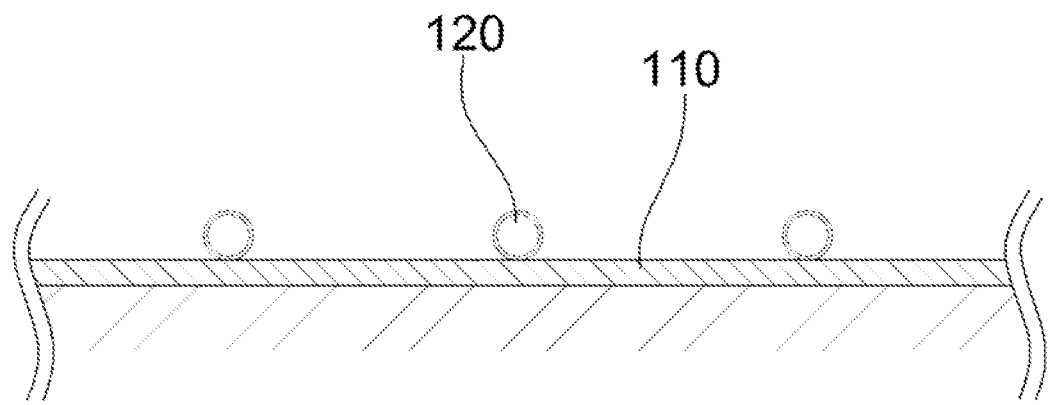
FIG. 3 shows the step of laying pipes.

This step is for laying one or more pipes 120 on the base plate 110 at a predetermined interval as shown in FIG. 3.

Figure 4:
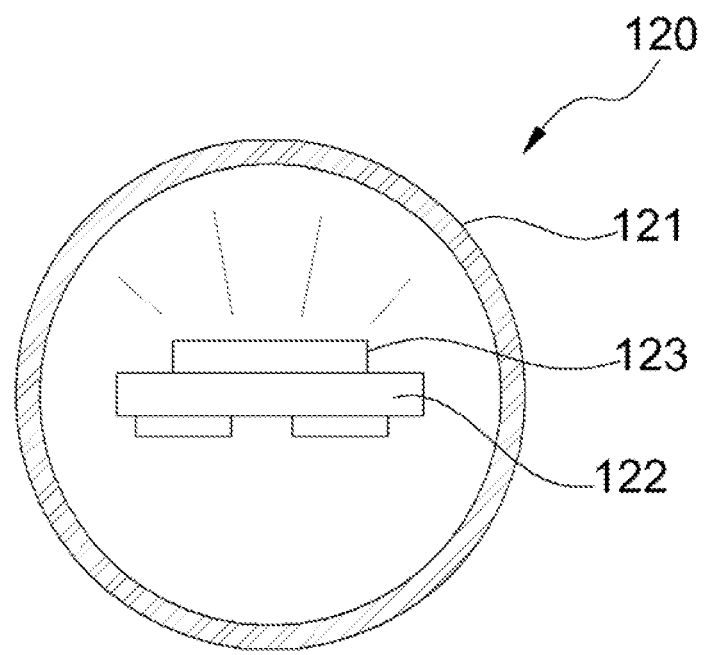
FIG. 4 shows a cross-section of a pipe with light-emitting function
Figure 5:
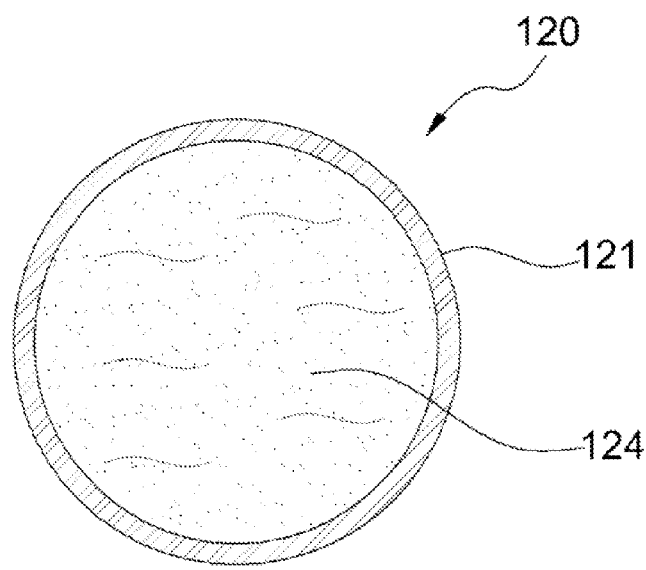
FIG. 5 shows a cross-section of a pipe with heat-radiating function
Figure 6:
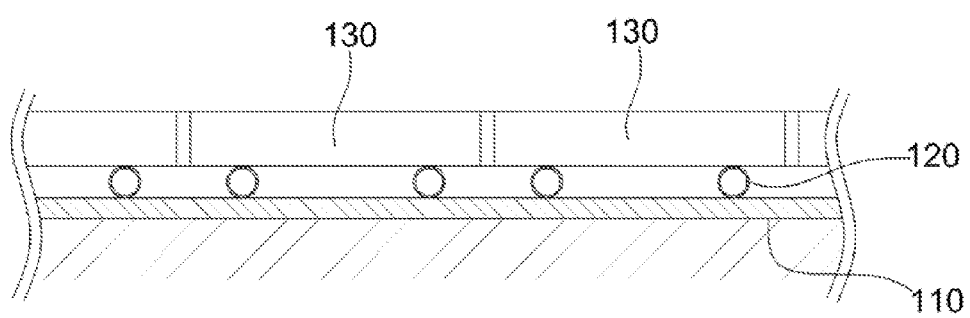
FIG. 6 shows the step of disposing a panel.

The pipes 120 have light-emitting or heat-radiating functions. The light-emitting pipe 120 has LEDs 123 and a LED control board 122 inserted inside a pipe 121 as shown in FIG. 4. The pipe 121 is made of transparent material to project the light to outside.

The heat-radiating pipe 120 is filled with hot water 124 inside the pipe 121 to heat the road. In reference to the heat-radiating pipe 120, it is recommended to make the pipe 121 with metal of excellent thermal conductivity. Or otherwise, the heat-radiating pipe 120 can be made by installing electric wire inside the pipe to be heated by power application.

In the step of (S30) laying pipes, either the light-emitting pipe or the heat-radiating pipe can be laid, or both of the light-emitting pipe and the heat-radiating pipe can be laid at the same time.

Step for Disposing a Panel (S40)

This step is for disposing a panel 130 on the pipes 120.

Figure 7:
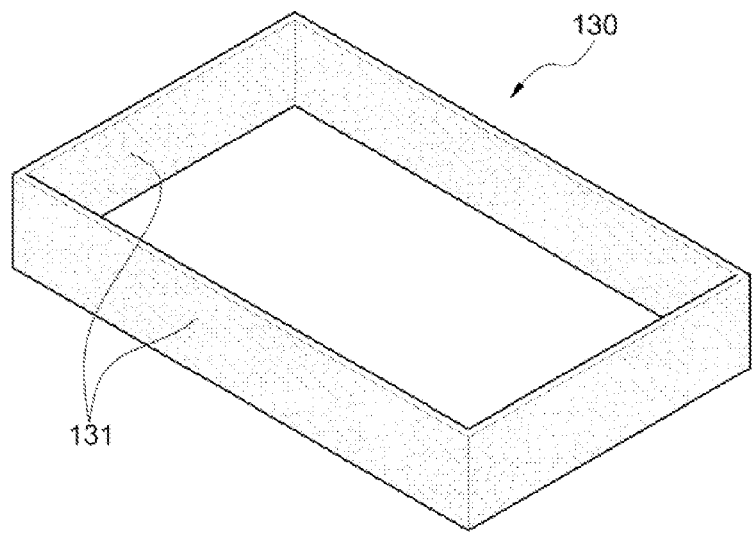
FIG. 7 is a perspective view of a panel.

The panel 130 reduces road repair or maintenance requirements by firmly fastening stones 140 not to be scattered or lost by vehicles or passengers. The panel 130 looks like a box, made from four vertical walls 131 without the bottom as shown in FIG. 7.

Step for Filling Stones (S50)

This step is for filling stones 140 inside the panel 130.

The stones 140 can be comprised of many different materials to substantially make trails, parking lots or sidewalks.

Transparent stones 140 are filled inside the panel 130 to project the light to outside in case when the light-emitting pipe 120 is installed in the step of (S30) laying pipes. The stones 140 made of transparent synthetic resin can project the color of light as it is emitted from the pipe 120 or desired colors can be emitted using various stones 140.

When the heat-radiating pipe 120 is installed in the step of (S30) laying pipes the stones 140 can be comprised of many different materials such as nearby gravel, soil or granite with excellent thermal conductivity.

Figure 8:
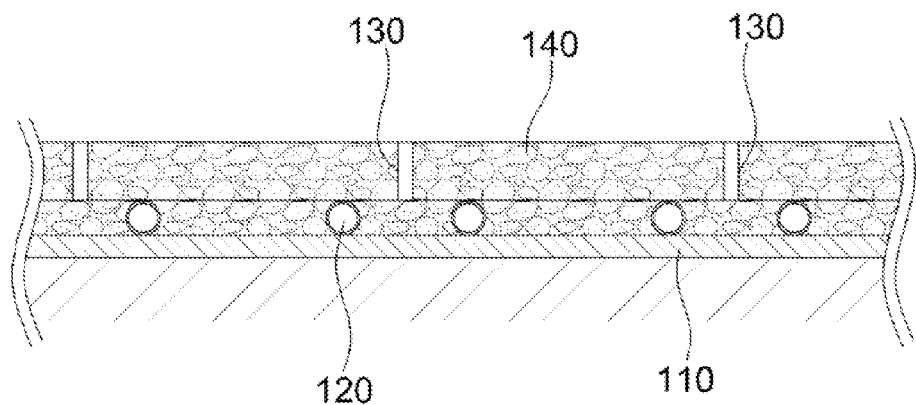
FIG. 8 shows the step of filling stones.
Figure 9:
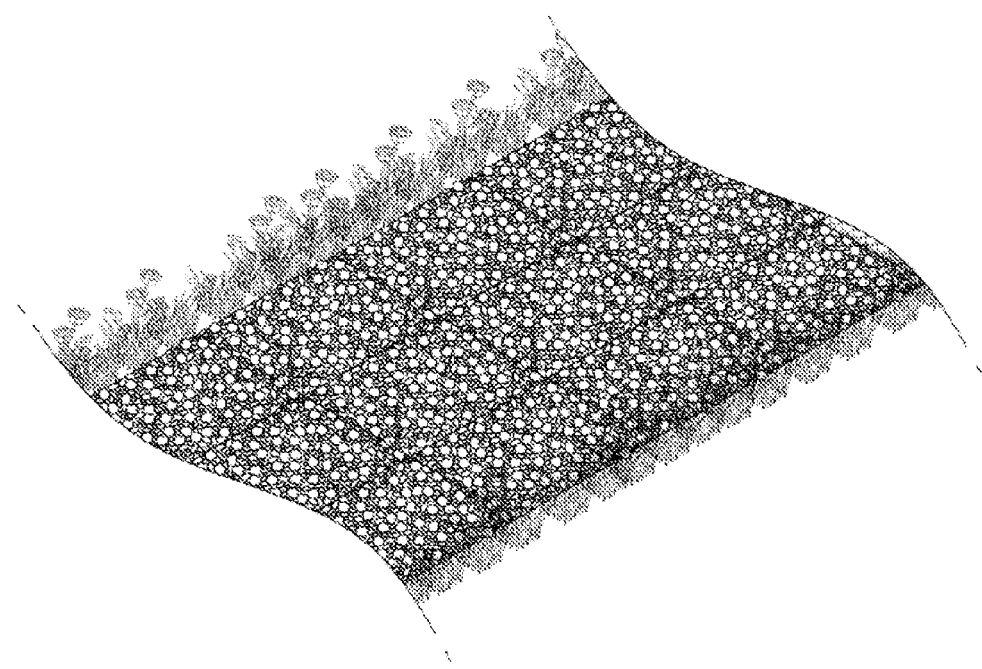
FIG. 9 shows a status of the functional road structure as used according to the invention.

The stones 140 are filled inside the panel 130 and around the pipe 120 in the step of (S50) filling stones as shown in FIG. 8. The base plate 110 prevents the stones from being stuck on the ground, and thus loss of stones 140. The panel 130 keeps the stones 140 from being lost by vehicles or passengers.

Figure 10:
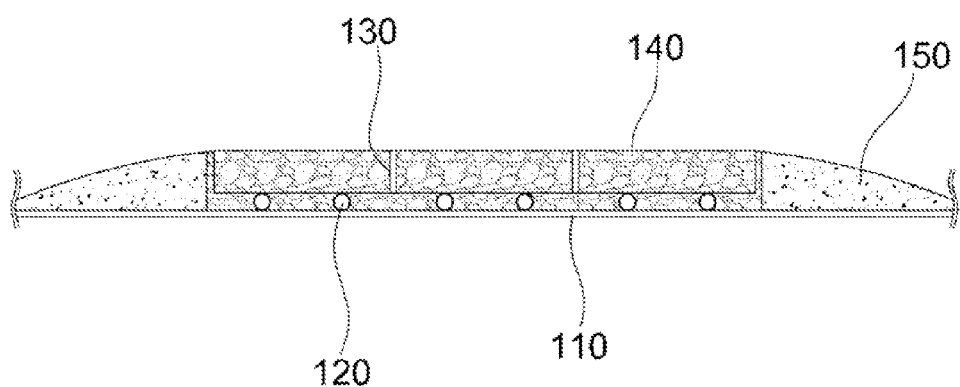
FIG. 10 shows a side-closing part constructed on both sides of the functional road structure as per the invention.

It is advised to construct a side-closing part 150 on both sides of the function road structure filled with stones 140 as shown in FIG. 10. The road surface is upraised after paving the base plate 110, laying the pipes 120 and disposing the panel 130 on the road, and thus it is necessary to construct the inclined side-closing part 150 on both sides of the functional road in order to prevent the safety accidents as shown in FIG. 10. The side-closing part 150 is constructed with stones 140, gravel or soil.

Figure 11:
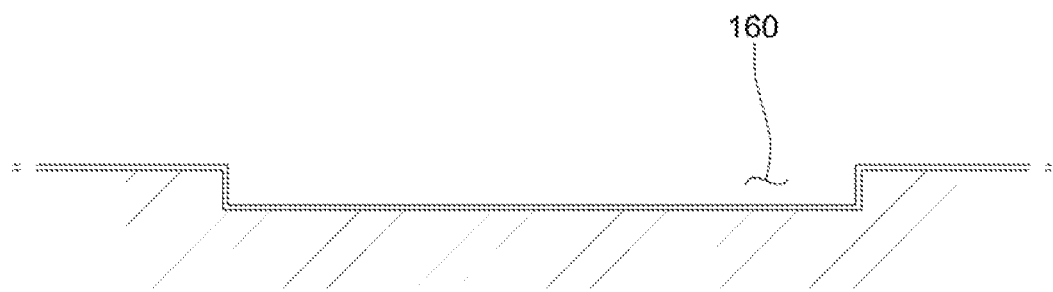
FIG. 11 shows a pit dug as deep as required for constructing the functional road structure therein.

The level of the road can become even with the ground by constructing the functional road structure in the pit 160 dug in the step of (S10) cleaning road as deep as the height of the functional road structure as shown in FIG. 11.

The functional road as per the present invention is easy to construct and road repair or maintenance is less frequently required by keeping stones from being lost.

The colors or heat of road, from the light-emitting pipe 120 through transparent stones 140 or from the heat-radiating pipe 120, can be widely applied to swimming pool, waterpark, hotel, pension, theme park or amusement park. The heat-radiating road provides warmth to visitors at outdoor swimming pool in other seasons than summer or prevents accidents on frozen parking lots in winter. The light-emitting road illuminates walkways of hotel, pension or amusement park along with decorative effects and drivers can quickly catch people crossing the street or easily recognize pedestrian signal with red or green light installed on the crosswalk.

Further, the functional road has a far greater water permeability than any other road.

It is understood that the above technical structure of this invention can be carried out in another concrete form without changing the technical ideas or required characteristics by those skilled in the art to which this invention belongs. Therefore, it shall be interpreted that the above described embodiments are examples but not limited in all aspects, this invention is represented by the claims below rather than by the above-described embodiments, and all changes or altered forms drawn from the meaning, scope or the deemed equivalent of the claim are included in the scope of this invention.

REFERENCE NUMERALS

S10: Step for Cleaning Road
S20: Step for Paving a Base Plate
S30: Step for Laying Pipes
S40: Step for Disposing a Panel
S50: Step for Filling Stones
110: Base Plate
120: Pipe
121: Pipe
122: Control Board
123: Light Emitting Diode (LED)
124: Hot Water
130: Panel
131: Vertical Wall
140: Filling Stone
150: Side-Closing Part
160: Pit

What is claimed is:

1. A method of constructing a functional road structure, comprising:
    cleaning the road by removing debris and leveling the road evenly;
    paving a base plate of mesh on the road, the size of mesh being smaller than that of filling stones;
    laying one or more pipes on the base plate at a predetermined interval, the pipes being made of transparent material inside which light-emitting-diodes and a control board therefor are inserted;
    disposing a panel on the pipe, the panel being of six-sided shape with open top and bottom; and
    filling the filling stones inside the panel.

2. The method according to claim 1, wherein the step of cleaning further comprises: digging a pit on the road as deep as the height of the functional road structure, and constructing the functional road structure in the pit.

3. The method according to claim 1, wherein the step of filling further comprises: constructing an inclined side-closing part on both sides of the functional road structure raised after the construction thereof.

4. The method according to claim 1, wherein the base plate is made of non-woven fabric or mesh.

5. The method according to claim 1, wherein the filling stones are made of transparent synthetic resin.

6. The method according to claim 1, wherein the filling stones comprise either one or more of gravel, soil or granite.

7. A functional road structure, comprising:
    a base plate of mesh which is paved on the road, the size of mesh being smaller than that of filling stones;

one or more pipes made of transparent material inside which light-emitting-diodes and a control board therefor are inserted, the pipes being laid on the base plate at a predetermined interval;
a panel of six sides with open top and bottom, the panel being disposed on the pipes; and
filling stones which are filled inside the panel and around the pipe.

8. The functional road structure according to claim 7, wherein the filling stones are made of transparent synthetic resin.

9. The functional road structure according to claim 7, wherein the filling stones comprise either one or more of gravel, soil or granite.

* * * * *